United States Patent [19]

Gardner et al.

[11] Patent Number: 5,514,742

[45] Date of Patent: May 7, 1996

[54] SUPPRESSION OF UV-YELLOWING OF PHOSPHITES THROUGH THE USE OF POLYAMINES

[75] Inventors: Pamela Gardner, Reno, Ohio; James Mahood, Morgantown, W. Va.

[73] Assignee: General Electric Company, Pittsfield, Mass.

[21] Appl. No.: 383,043

[22] Filed: Feb. 3, 1995

[51] Int. Cl.$^6$ .............................. C08K 5/527; C08K 5/526
[52] U.S. Cl. ..................... 524/119; 524/120; 524/126; 524/151; 524/153; 524/252; 252/400.24; 101/483; 558/71
[58] Field of Search ....................... 252/400.24; 524/119, 524/126, 120, 153, 252, 151; 558/71

[56] References Cited

U.S. PATENT DOCUMENTS

| | | |
|---|---|---|
| 3,274,146 | 9/1966 | Lecher . |
| 3,376,232 | 4/1968 | Coover et al. ........................... 252/400 |
| 3,454,521 | 7/1969 | Tholstrup . |
| 3,523,099 | 8/1970 | Shepard et al. . |
| 3,533,989 | 10/1970 | Wescott, Jr. . |
| 3,553,298 | 1/1971 | Hodan et al. ............................ 558/71 |
| 3,560,434 | 2/1971 | Abramoff . |
| 3,644,280 | 2/1972 | Tazewell . |
| 3,886,114 | 5/1975 | Beadle . |
| 3,904,565 | 9/1975 | Yoshiura et al. . |
| 3,969,315 | 7/1976 | Beadle . |
| 4,116,926 | 9/1978 | York . |
| 4,318,845 | 3/1982 | Spivack et al. . |
| 4,321,190 | 3/1982 | Costanzi et al. ......................... 524/252 |
| 4,559,378 | 12/1985 | Kay et al. . |
| 4,650,894 | 3/1987 | Fisch et al. . |
| 4,666,959 | 5/1987 | Weissberger et al. . |
| 4,673,701 | 6/1987 | Minagawa et al. . |
| 4,707,509 | 11/1987 | Fisch et al. . |
| 4,857,230 | 8/1989 | Matsummura . |
| 4,912,156 | 3/1990 | Yagi et al. . |
| 4,925,888 | 5/1990 | Aumueller et al. . |
| 4,957,956 | 9/1990 | Neri et al. . |
| 5,039,723 | 8/1991 | Haruna et al. . |
| 5,371,263 | 12/1994 | Quotschalla et al. ..................... 558/71 |
| 5,468,895 | 11/1995 | Mahood ................................... 524/119 |

FOREIGN PATENT DOCUMENTS 49-30327  3/1974  Japan ........................................ 558/71

OTHER PUBLICATIONS

TechCommentary/vol. 4, No. 4, 1987, pp. 1–4, Ultraviolet Curing Technology.
Coordination Polymerization, A Memorial to Karl Ziegler, edited by James C. W. Chien, University of Massachusetts, Academic Press, Inc., pp. 92–98 and 105–108.

*Primary Examiner*—Veronica P. Hoke

[57] ABSTRACT

A polymer composition is provided comprising an ultraviolet light sensitive phosphite and an amount of a polyamine effective to enhance the resistance of the color formation upon exposure to ultraviolet light. A process is also provided for applying ink to a thermoplastic substrate involving ultraviolet light curing of the ink. The thermoplastic compositions are useful for making article which contain UV sensitive phosphites for oxidative stability and also exhibit resistance to ultraviolet light yellowing of the phosphite. The inking process resists detrimental yellowing of the composition upon exposure to high levels of ultraviolet light radiation.

13 Claims, No Drawings

SUPPRESSION OF UV-YELLOWING OF PHOSPHITES THROUGH THE USE OF POLYAMINES

BACKGROUND OF THE INVENTION

1. Field of the Invention

The present invention relates to phosphite stabilized polymer compositions, and more particularly relates to phosphite stabilized polymer compositions containing amine compounds.

2. Description of the Related Art

Polymer compositions have been previously stabilized with alkylphenyl phosphites. Such phosphites have typically contained monoamine compounds for the purpose of rendering the phosphite more resistant to moisture. Such monoamine levels in the phosphite compositions have typically been low for the purpose of minimizing the amount of amines present. Such compositions, however, when used to stabilize polymers, have resulted in some degree of yellowing upon extended exposure to ultraviolet light. Additionally, recent developments in inking processes involving the application of ink to polymer substrates have involved the application of ultraviolet light curable inks to the substrate followed by exposure of the ink and substrate to high levels of ultraviolet light. Such processes have undesirably resulted in the yellowing of substrates which contain UV sensitive phosphites.

Accordingly, there is a need to produce polymer compositions containing certain phosphites which exhibit enhanced resistance to UV yellowing.

SUMMARY OF THE INVENTION

The present invention provides polymer compositions containing a phosphite which is vulnerable to some degree of UV yellowing, and further contains an amount of an aliphatic polyamine sufficient to enhance the phosphites resistance to UV yellowing. The phosphites utilized in the compositions of the present invention have a moiety of the formula

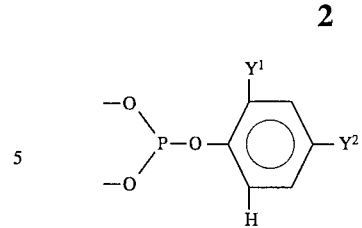

wherein $Y^1$ is a tertiary alkyl or tertiary aralkyl, and preferably is a t-butyl group or cumyl and $Y^2$ is selected from the group consisting of hydrogen, alkyl, and aralkyl, and is preferably a t-butyl group or cumyl group. The polyamine is present in an amount sufficient to enhance the resistance of the phosphite to UV yellowing. Preferably the phosphite is present in the composition at a level of 100 parts per million to 1,500 parts per million based on the total weight of the composition, and preferably the polyamine is present at a level of from 50 parts per million to 500 parts per million based on the total weight of the composition. The present invention further involves an inking process involving UV curing of inks on a substrate made from the present composition.

DETAILED DESCRIPTION OF THE INVENTION

The phosphites of the present compositions have moieties of the following formula

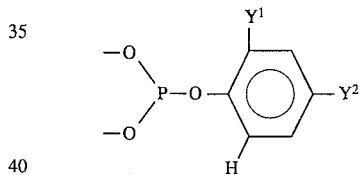

wherein $Y^1$ is a tertiary alkyl group or tertiary aralkyl, and is preferably t-butyl or cumyl; and $Y^2$ is hydrogen, alkyl or aralkyl, and is preferably t-butyl or cumyl. The phosphites preferably are of the formula

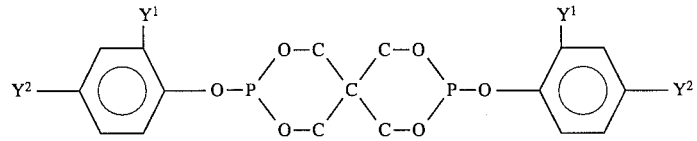

wherein $Y^1$ and $Y^2$ are defined above.
Most preferably the phosphite is of the formula

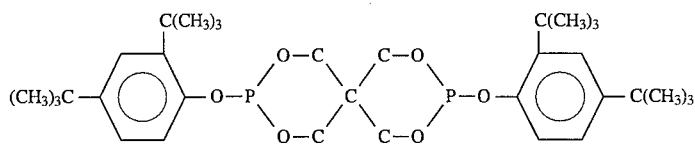

The structural name for the most preferred phosphite is bis(2,4-di-t-butylphenyl)pentaerythritol diphosphite.

The aliphatic polyamine preferably has a boiling point of greater than 175°, more preferably greater than 190°, and most preferably greater than 200° C. The aliphatic polyamine may contain primary, secondary or tertiary amine groups. Preferably the amine groups are primary amine groups. The polyamine may contain 2, 3 or more amine groups, and in other words may be a diamine, triamine or greater polyamine amine. The preferred polyamines are aliphatic primary diamines of the formulas

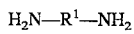
$$H_2N-R^1-NH_2$$

wherein $R^1$ is selected from $C_6$ to $C_{10}$ divalent alkyl radicals, and more preferably the diamine is selected from 1,6 diamine hexane and 1,10-diaminodecane. Suitable aliphatic secondary diamines may be represented by the general formula:

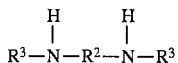

wherein $R^2$ is selected from $C_1$ to $C_{10}$ divalent alkyl radicals and each $R^3$ is selected from $C_1$ to $C_{10}$ monovalent alkyl radicals. Suitable aliphatic tertiary diamines may be represented by the general formula

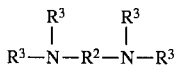

wherein $R^2$ and $R^3$ are defined as above. Most preferably the polyamine is an aliphatic primary diamine.

Preferably the amines are selected from the group consisting of n,n,n',n'-tetraethyl-1,3-propane diamine, 1,6-hexane diamine and 1,10-decane diamine.

An amount of the phosphites of the invention is considered to be an "effective amount" when the polymer composition containing the phosphites of the invention shows improved stability in any of its physical or color properties upon exposure to ultraviolet light in comparison to an analogous polymer composition which does not include the polyamine of the invention. In most polymer compositions, however, it will be preferred that the phosphites be present in an amount equal to about 0.01 to about 2 parts by weight per 100 parts by weight resin (phr). Amounts of about 0.01 to about 1 phr are more preferred, although most compositions will contain about 0.025 phr or more. The polymer composition may be thermoset in nature including unsaturated polyesters, phenolics, epoxie, urethanes, coating resins and crosslinkable latexes.

The polymer may also be any thermoplastic known in the art, such as polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Mixtures of different polymers, such as polyphenylene ether/styrenic resin blends, polyvinyl chloride/ABS or other impact modified polymers, such as methacrylonitrile and alphamethylstyrene containing ABS, and polyester/ABS or polycarbonate/ABS and polyester plus some other impact modifier may also be used. Such polymers are available commercially or may be made by means well known in the art. However, the phosphites of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example polypropylene, polyisobutylene, polybutene-1, polymethylpantene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octane, propylene/ isobutylene, ethylene/butane-1, propylene/butadiene, isobutylene, isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbornene; as well as mixtures of such copolymers and their mixtures with polymers mentioned above, for example polypropylene/ethylene propylene-copolymers, LDPE/ EVA, LDPE/EAA, LLDPE/EVA and LLDPE/EAA.

Thermoplastic polymers may also include styrenic polymers, such as polystyrene, poly-(p-methylstyrene), poly-(α-methylstyrene), copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methylacrylate, mixtures of high impact strength from styrene copolymers and another polymer, such as, for example, from a polyacrylate, a diene polymer or an ethylene/propylene/diene terpolymer; and block copolymers of styrene, such as, for example, styrene/ butadiene/styrene, styrene/isoprene/styrene, styrene/ethylene/butylene/styrene or styrene/ethylene/propylene styrene. Styrenic polymers may additionally or alternatively include graft copolymers of styrene or alpha-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/-propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs, such as polymethacrylonitrile, polyacrylonitrile, acrylonitrile/-butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homo-and copolymers, polyvinyl chloride, polyvinyl bromide, polyvinyl fluoride, polyvinylidene chloride, chlorinated polyethylene, chlorinated polypropylene, florinated polyvinylidene, brominated polyethylene, chlorinated rubber, vinyl chloride-vinylacetate copolymers, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-butadiene copolymer, vinyl chloride isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1,4 -dimethylol-cyclohexane terephthalate, poly-2(2,2,4(4 -hydroxyphenyl) -propane-)terephthalate and polyhydroxybenzoates as well as block-copolyetheresters derived from polyethers having hydroxyl end groups.

Polyamides and copolyamides which are derived from diamines and dicarboxylic acids and/or from aminocarboxylic acids or the corresponding lactams, such as polyamide, 4,polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylene diamine and isophthalic or/and terephthalic acid and optionally an elastomer as modifier, for example poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Polyolefin, polyalkylene terephthalate, polyphenylene ether and styrenic resins, and mixtures thereof are more preferred, with polyethylene, polypropylene, polyethylene terephthalate, polyphenylene ether homopolymers and copolymers, polystyrene, high impact polystyrene, polycarbonates and ABS-type graft copolymers and mixtures thereof being particularly preferred.

The resulting stabilized polymer compositions of the invention may optionally also contain or be free of various conventional additives, such as the following:

1. Antioxidants
   1.1 Alkylated monophenols, for example: 2,6 -di-tert-butyl-4-methylphenol, 2-tert-butyl-4,6-dimethylphenol, 2,6-di-tert-butyl-4-ethylphenol, 2,6 -di-tert-butyl-4-n-butylphenol, 2,6-di-tert-butyl-4-isobutylphenol, 2,6-dicyclopentyl-4-methylphenol, 2 -(alpha-methylcyclohexyl-4,6 dimethylphenol, 2,6-di-octadecyl-4 -methylphenol, 2,4,6,-tricyclohexyphenol, 2,6-di-tert-butyl-4-methoxymethylphenol.
   1.2 Alkylated hydroquinones, for example, 2,6 -di-tert-butyl-4-methoxyphenol, 2,5-di-tert-butylhydroquinone, 2,5-di-tert-amyl-hydroquinone, 2,6 -diphenyl-4-octadecyloxyphenol.
   1.3 Hydroxylated thiodiphenyl ethers, for example, 2,2'-thio-bis-(6-tert-butyl-4-methylphenol), 2,2'-thio-bis-(4-octylphenol), 4,4'thio-bis-(6-tert-butyl-3 -methylphenol), 4,4'-thio-bis-(6-tert-butyl-2-methylphenol).
   1.4 Alkylidene-bisphenols, for example, 2,2' -methylene-bis-(6-tert-butyl-4-methylphenol), 2,2' -methylene-bis-(6-tert-butyl-4-ethylphenol), 2,2' -methylene-bis-(4-methyl-6-(alpha-methylcyclohexyl)phenol), 2,2'-methylene-bis-(4 -methyl-6-cyclohexylphenol), 2,2'-methylene-bis-(6 -nonyl-4-methylphenol), 2,2'-methylene-bis-(6-nonyl-4-methylphenol), 2,2'-methylene-bis-(6-(alpha-methylbenzyl)-4 -nonylphenol), 2,2'-methylene-bis-(6 -(alpha,alpha-dimethylbenzyl)-4-nonylphenol). 2,2' -methylene-bis-(4,6-di-tert-butylphenol), 2,2' -ethylidene-bis-(6-tert-butyl-4-isobutylphenol), 4,4' -methylene-bis-(2,6-di-tert-butylphenol), 4,4' -methylene-bis-(6-tert-butyl-2-methylphenol), 1,1-bis-(5-tert-butyl-4-hydroxy-2-methylphenol)butane. 2,6 -di-(3-tert-butyl-5-methyl-2-hydroxybenzyl)-4-methylphenol, 1,1,3-tris-(5-tert-butyl-4-hydroxy-2 -methylphenyl)butane, 1,1-bis-(5-tert-butyl-4-hydroxy-2 -methylphenyl)-3-dodecyl-mercaptobutane, ethyleneglycol-bis-(3,3,-bis-(3'-tert-butyl-4' -hydroxyphenyl)-butyrate)-di-(3-tert-butyl-4-hydroxy-5-methylphenyl)-dicyclopentadiene, di-(2-(3'-tert-butyl-2'hydroxy-5'methyl-benzyl)-6 -tert-butyl-4-methylphenyl)terephthalate.
   1.5 Benzyl compounds, for example, 1,3,5-tris-(3,5-di-tert-butyl-4-hydroxybenzyl)-2,4,6-trimethylbenzene, bis-(3,5-di-tert-butyl-4-hydroxybenzyl)sulfide, isooctyl 3,5-di-tert-butyl-4 -hydroxybenzyl-mercapto-acetate, bis-(4-tert-butyl-3 -hydroxy-2,6-dimethylbenzyl)dithiol-terephthalate. 1,3,5-tris-(3,5-di-tert-butyl-4-hydroxybenzyl)isocyanurate. 1,3,5-tris-(4-tert-butyl-3 -hydroxy-2,6-dimethylbenzyl)isocyanurate, dioctadecyl 3,5-di-tert-butyl-4-hydroxybenzylphosphonate, calcium salt of monoethyl 3,5-di-tert-butyl- 4-hydroxybenzylphosphonate, 1,3,5-tris-(3,5 -dicyclohexyl-4-hydroxybenzyl)isocyanurate.
   1.6 Acylaminophenols, for example, 4-hydroxylauric acid anilide, 4-hydroxy-stearic acid amilide, 2,4-bis-octylmercapto-6-(3,5-tert-butyl-4 -hydroxyanilino)-s-triazine, octyl-N-(3,5-di-tert-butyl- 4-hydroxyphenyl)-carbamate.
   1.7 Esters of beta-(3,5-di-tert-butyl-4 -hydroxyphenol)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethylisocyanurate, thiodiethyleneglycol, di-hydroxyethyl oxalic acid diamide.

1.8 Esters of beta-(5-tert-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thidiethyleneglycol, dihydroxyethyl oxalic acid diamide.

1.9 Esters of beta-(5-tert-butyl-4-hydroxy-3-methylphenyl) propionic acid with mono-or polyhydric alcohols, e.g., with methanol, diethylene glycol, octadecanol, triethylene glycol, 1,6-hexanediol, pentaerythritol, neopentyl glycol, tris(hydroxyethyl)isocyanurate, thiodiethylene glycol, N,N-bis(hydroxyethyl)oxalic acid diamide.

1.10 Amides of beta-(3,5-di-tert-butyl-4 -hydroxyphenol)-propionic acid for example, N,N'-di-(3,5-di-tert-butyl-4-hydroxyphenylpropionyl)hexamethylen-diamine, N,N'-di-(3,5-di-tert-butyl-4-hydroxyphenylpropionyl)trimethylenediamine, N,N'-di-(3,5-di-tert-butyl-4-hydroxyphenylpropionyl)hydrazine.

2. UV absorbers and light stabilizers.

2.1 2-(2'-hydroxyphenyl)-benzotriazoles, for example, the 5'methyl-, 3,5'-di-tert-butyl-, 5'-tert-butyl-, 5'(1,1,3,3-tetramethylbutyl)-, 5-chloro-3',5' -di-tert-butyl-, 5-chloro-3'tert-butyl-5'methyl-, 3'sec-butyl-5'tert-butyl-, 4'-octoxy, 3',5'-di-tert-amyl-3',5'-bis-(alpha, alpha-dimethylbenzyl)-derivatives.

2.2 2-Hydroxy-benzophenones, for example, the 4-hydroxy-4-methoxy-, 4-octoxy, 4-decyloxy-, 4 -dodecyloxy-, 4-benzyloxy, 4,2',4'-trihydroxy- and 2'hydroxy-4,4'-dimethoxy derivative.

2.3 Esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)resorcinol, benzoylresorcinol, 2,4-di-tert-butyl-phenyl- 3,5-di-tert-butyl-4-hydroxybenzoate and hexadecyl-3,5-di-tert-butyl-4-hydroxybenzoate.

2.4 Acrylates, for example, alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or butyl ester, alpha-carbomethoxy-p-methoxy-cinnamic acid methyl ester, N-(beta-carbomethoxy-beta-cyano-vinyl)- 2-methyl-indoline.

2.5 Nickel compounds, for example, nickel complexes of 2,2'-thio-bis(4-(1,1,1,3 -tetramethylbutyl)-phenol), such as the 1:1 or 1:2 complex, optionally with additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, such as of the methyl, ethyl, or butyl ester, nickel complexes of ketoximes such as of 2-hydroxy-4-methyl-penyl undecyl ketoxime, nickel complexes of 1-phenyl-4-lauroyl-5-hydroxy-pyrazole, optionally with additional ligands.

2.6 Sterically hindered amines, for example bis(2,2,6,6-tetramethylpiperidyl)-sebacate, bis-( 1,2,2,6,6-pentamethylpiperidyl)-sebacate, n-butyl-3,5-di-tert-butyl-4-hydroxybenzyl malonic acid bis(1,2,2,6,6,-pentamethylpiperidyl)ester, condensation product of 1-hydroxyethyl-2,2,6,6 -tetramethyl-4-hydroxy-piperidine and succinic acid, condensation product of N,N'-(2,2,6,6 -tetramethylpiperidyl)-hexamethylendiamine and4-tert-octylamino- 2,6-dichloro-1,3,5-s-triazine, tris-(2,2,6,6-tetramethylpiperidyl)-nitrilotriacetate, tetrakis-(2,2,6,6-tetramethyl-4-piperidyl)-1, 2,3,4 -butane-tetra-carbonic acid, 1,1'(1,2-ethanediyl)-bis-(3,3,5,5-tetramethylpiperazinone). Such amines include hydroxylamines derived from hindered amines, such as di(1-hydroxy-2,2,6,6-tetramethylpiperidin-4-yl)sebacate: 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)piperdine; and N-(1-hydroxy-2,2,6,6-tetramethyl-piperidin- 4-yl)-epsiloncaprolactam.

2.7 Oxalic acid diamides, for examples, 4,4' -dioctyloxy-oxanilide, 2,2'-di-octyloxy-5',5'-di-tert-butyloxanilide, 2,2'-di-dodecyloxy-5',5'di-tert-butyl-oxanilide, 2-ethoxy-2'-ethyl-oxanilide, N,N'-bis(3-dimethylaminopropyl)-oxalamide, 2-ethoxy-5 -tert-butyl-2'-ethyloxanilide and its mixture with 2 -ethoxy-2'ethyl-5,4-di-tert-butyloxanilide and mixtures of ortho- and para-methoxy- as well as of o- and p-ethoxy-disubstituted oxanilides.

3. Metal deactivators, for example, N,N'-diphenyloxalic acid diamide, N-salicylal-N'-salicyloylhydrazine, N,N'-bis-salicyloylhydrazine, N,N'-bis-(3,5-di-tert-butyl-4-hydrophenylpropionyl)hydrazine, salicyloylamino-1,2,4-triazole, bis-benzyliden-oxalic acid dihydrazide.

4. Phosphites and phosphonites, for example, triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, tristearyl sorbitol triphosphite, and tetrakis(2,4-di-tert-butylphenyl)4,4'-biphenylene diphosphonite.

5. Peroxide scavengers, for example, esters of betathiodipropionic acid, for example the lauryl, stearyl, myristyl or tridecyl esters, mercaptobenzimidazole or the zinc salt of 2-mercaptobenzimidazole. zinc-dibutyldithiocaramate, dioctadecyldisulfide, pentaerythritoltetrakis-(beta-dodecylmercapto)-propionate.

6. Polyamide stabilizers, for example copper salts in combination with iodides and/or phosphorus compounds and salts of divalent manganese.

7. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, Ca stearate, calcium stearoyl lactate, calcium lactate, Zn stearate, Mg stearate, Na ricinoleate and K palmirate, antimony pyrocatecholate or zinc pyrocatecholate.

8. Nucleating agents, for example, salts of benzoic, 4-tert butylbenzoic acid, adipic acid, diphenylacetic acid.

9. Fillers and reinforcing agents, for example, calciumcarbonate, silicates, glass fibers, asbestos, talc, kaolin, mica, barium sulfate, metal oxides and hydroxides, carbon black and graphite.

10. The present invention may also be used in conjunction with aminoxy propanoate derivatives such as methyl-3-(N,N-dibenzylaminoxy)propanoate;ethyl-3 -(N,N- dibenzylaminoxy)propanoate; 1,6-hexamethylene-bis(3-N,N-dibenzylaminoxy)propanoate); methyl-(2-(methyl)-3(N,N-dibenzylaminoxy)propanoate); octadecyl-3-(N,N-dibenzylaminoxy)propanoic acid; tetrakis (N,N-dibenzylaminoxy)ethyl carbonyl oxymethy)methane; octadecyl-3-(N,N-diethylaminoxy)propanoate; 3-(N,N-dibenzylaminoxy)propanoic acid potassium salt; and 1,6-hexamethylene bis(3-(N-allyl-N-dodecyl aminoxy)propanoate).

11. Other additives, for example, plasticizers, lubricants, emulsifiers, pigments, optical brighteners, flameproofing agents, anti-static agents, blowing agents and thiosynergists such as dilaurythiodipropionate or distearylthiodipropionate.

Olefin polymers may be produced by polymerization of olefins in the presence of Ziegler-Natta catalysts optionally on supports such as but not limited to Mg $Cl_2$, chromium salts and complexes thereof, optionally supported on Silica or other materials. They may also be produced utilizing catalysts based on cyclopentadiene complexes of metals typically complexes of Ti or Zr.

Consistent with the invention, the phosphites of the invention may be added to the polymer at any time prior to or during fabrication into articles and may be combined with the polymer by any of a variety of means known in the art, such as by preblending or by being fed directly into fabrication equipment.

The polypropylene compositions may include residual catalyst such as Ziegler catalysts which may be carried on a support (i.e. $TiCl_3$ on $MgCl_2$). Other stabilizers may also be incorporated in the compositions.

The preferred polymers are polyolefins, more particularly polyalphaolefins.

The compositions of the present invention preferably contain a thermoplastic resin at a level of at least 90 percent by weight based on the total weight of the composition, more preferably at a level of at least 95 percent based on the total weight of the composition, and most preferably present of at least 99 percent by weight based on the total weight of the composition. The composition preferably contains the above phosphites at a level of from 100 parts per million by weight to 1,500 parts per million by weight (ppm) based on the total weight of the composition, more preferably in a range of from 200 ppm to 700 ppm based on the total weight of the composition. The polyamine is preferably present in the composition at a level of from 25 parts per million by weight based on the total weight of the composition to 500 parts per million based on the total weight of the composition, and more preferably present at a level of from 50 ppm to 300 ppm based on the total weight of the composition, and most preferably present at a level of from 100 ppm to 250 ppm based on the total weight of the composition. One further limitation in the present compositions is that the phosphite level to polyamine level be in a ratio such that there is a relatively high amount of polyamine compared to prior amine compositions, preferably the phosphite to polyamine ratio is no greater than 3:1, preferably between 3:1 and 1:1 based on a weight ratio, more preferably between 3:1 and 2:1, and most preferably between 3:1 and 2.5:1. Phosphite and polyamine may be preblended to prepare a preblend composition consisting essentially of the phosphite and polyamine. Alternatively, the stabilizer composition may consist of the phosphite and the polyamine in the above ratios.

The UV stability of the present polymer composition is especially important in UV inking processes. The inking process involves:

(a) applying a UV curable ink to a substrate made from the present polymer composition; and (b) exposing the ink and substrate to a level of ultraviolet light sufficient to cure the ink. Suitable classes of inks contain a photoinitiator with oligomers and monomers that will then cure when exposed to UV energy. The level of UV exposure is typically at wavelengths of less than 300 nm. The substrate may be in the form of a molded article such as a bottle, or an extruded substrate such as a film or sheet.

Radiation curing processes, specifically UV curing processes, are sometimes referred to as photopolymerization, and involve using liquid monomers and oligomers in combination with photoinitiators to form a curable composition which then is exposed to radiation, specifically UV radiation, to instantly harden and become coatings, adhesives or decorative inks. Typically wavelengths of from 200 to 450 nm are utilized in the curing processes. Where adhesives are used, include such applications as bonding electronic components and printed circuit boards and splicing optical fibers. Typically UV applications result in a cured thickness of between 0.3 and 1 mil, although thickness is up to 20 mils may be UV cured. The present invention may be utilized in any situation involving UV curing, more broadly radiation curing, of materials onto thermoplastics which are stabilized with phosphites.

During normal polymer processing, a portion of the phosphite additive is oxidized to a phosphate. Typically the processed polymer composition will have an unoxidized phosphite level of between 20 percent by weight to 95 percent by weight based on the original phosphite loading level, more typically between 50 to 70 percent by weight thereof. Ultraviolet light yellowing becomes more prominent at relatively higher loadings of the phosphite additive, for example, levels of greater than 100 ppm based on the total weight of the polymer. An important element to reducing the UV yellowing is the ratio of polyamine to unoxidized phosphite, wherein the ratio is at least 1:3.

EXAMPLES

The following examples illustrate that the high loading of the aliphatic polyamine relative to the initial phosphite and unoxidized final phosphite yields reduced ultraviolet yellowing level of polyolefin compositions such as polypropylene. Note the no yellowing for examples 1–4 compared to the yellowing of comparative examples A–E. Phos 1 is bis(2,4-di-t-butylphenyl) pentaerythritol diphosphite. Phen 1 is a primary antioxidant, hindered phenol, sold as Iragnox 1010 available from The Ciba-Geigy Corporation. DAD is diaminodecane (a polyamine), and HAD is hexanethylenediamine (a polyamine). UOPH is the unoxidized phosphite level in the initial composition as measured by FTIR. Amounts are in parts per million based on the total weight of the composition.

TABLE 1

|  | A | 1 | 2 | B | C | 3 | 4 | D | E |
|---|---|---|---|---|---|---|---|---|---|
| Phos 1 | 500 | 500 | 500 | 500 | 500 | 500 | 500 | 500 | 500 |
| Phen 1 | 500 | 500 | 500 | 500 | 500 | 500 | 500 | 500 | 500 |
| DAD |  | 200 | 100 | 50 | 25 |  |  |  |  |
| HAD |  |  |  |  |  | 200 | 100 | 50 | 25 |
| UVY | yes | no | no | y-vsi | yes | no | no | y-vsi | yes |
| UOPH | 304 | 311 | 298 | 296 | 328 | 365 | 285 | 341 | 277 |

What is claimed is:

1. A thermoplastic composition comprising:

(a) a thermoplastic polyolefin resin;
(b) a phosphite and an aliphatic polyamine being present in said thermoplastic composition at a level of between 100 parts per million by weight and 1,500 parts per million by weight based on the weight of said phosphite, said phosphite and aliphatic polyamine being added to said resin as a preblend, said phosphite having the following moiety

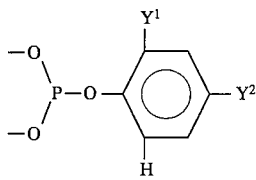

wherein Y1 is selected from the group consisting of tertiary alkyl and tertiary aralkyl, and each Y2 is independently selected from the group consisting of hydrogen, alkyls and aralkyls; said aliphatic polyamine being selected from the group consisting of polyamines having following formulae: $H_2N(-R^1)-NH_2$, $R^3-(NH)-R^2-(NH)-R^3$, and $R^3-(NR^3)-R^2-(NR^3)-R^3$, wherein $R^1$ is selected from $C_6$ to $C_{10}$ divalent alkyl radicals, $R^2$ is selected from $C_1$ to $C_{10}$ divalent alkyl radicals, and $R^3$ is selected from $C_1$ to $C_{10}$ monovalent alkyl radicals, wherein the weight ratio of phosphite to polyamine is between 3:1 and 1:1.

2. The composition of claim 1 wherein said phosphite is present at a level of 200 parts per million to 700 parts per million.

3. The composition of claim 1 wherein said phosphite is present at a level of about 500 parts per million.

4. The composition of claim 1 wherein the respective weight ratio of said phosphite and said polyamine is between 3:1 and 2.5:1 and said phosphite has the following formula:

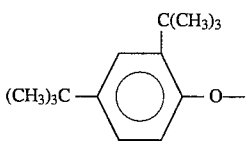

-continued

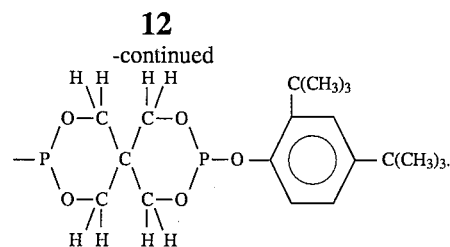

5. The composition of claim 2 wherein the respective weight ratio of phosphite to polyamine is between 3:1 and 2:1.

6. The composition of claim 2 wherein said phosphite and said polyamine are in the respective weight ratio between 3:1 and 2.5:1.

7. The composition of claim 1 wherein said thermoplastic resin is a polyolefin.

8. The composition of claim 1 wherein said phosphite is of the formula

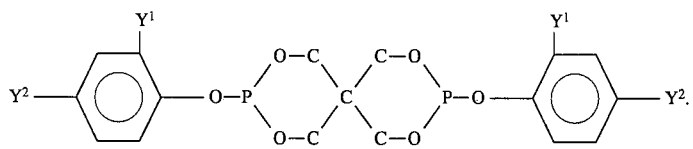

9. The composition of claim 8 wherein said phosphite is of the formula

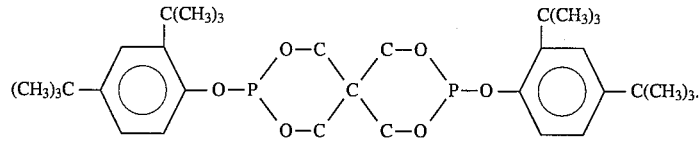

10. A phosphite composition which exhibits enhanced resistance to UV yellowing, said composition consisting essentially of:
(a) a phosphite having a moiety of the formula

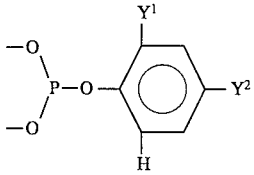

wherein Y1 is selected from the group consisting of tertiary alkyls and tertiary aralkyls, and Y2 is selected from the group of hydrogen, alkyls and aralkyls, and
(b) a polyamine, wherein said phosphite and said polyamine are in respective weight ratios of between 3:1 and 2:1, said polyamine being selected from the group consisting of polyamines having following formulae: $H_2N-(R^1-)NH_2$, $R^3-(NH)-R^2-(NH)-R^3$, and $R^3-(NR^3)-R^2-(NR^3)-R^3$, wherein $R^1$ is selected from $C_6$ to $C_{10}$ divalent alkyl radicals, $R^2$ is selected from $C_1$ to $C_{10}$ divalent alkyl radicals, and $R^3$ is selected from $C_1$ to $C_{10}$ monovalent alkyl radicals, wherein said phosphite and said polyamine are in respective weight ratio of phosphite to polyamine of between 3:1 and 1:1.

11. The composition of claim 10 wherein said polyamine is an aliphatic secondary polyamine and the weight ratio of said phosphite and said polyamine is between 3:1 and 2.5:1 and said phosphite has the following formula:

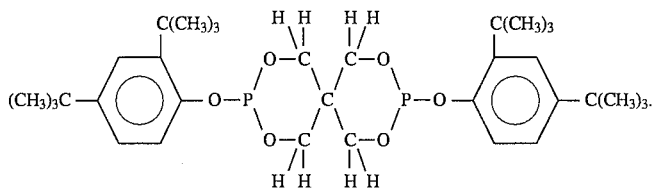

12. The composition of claim 10 wherein said composition consists of said phosphites and said polyamine and the weight ratio of said phosphite and said polyamine is between 3:1 and 2.5:1 and said phosphite has the following formula:

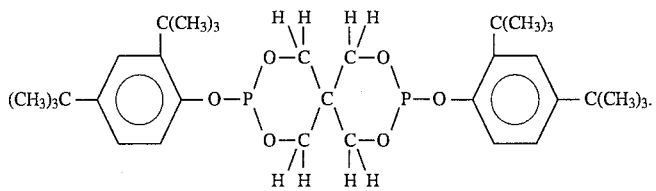

13. The composition of claim 10 wherein said phosphite is of the general formula

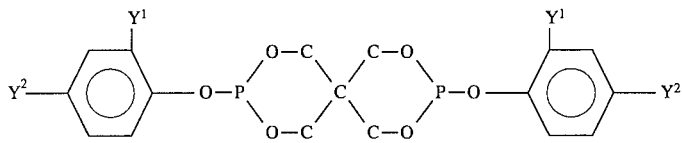

wherein $Y^1$ and $Y^2$ are each independently selected from the definition of the respective $Y^1$ and $Y^2$ set out above.

* * * * *